United States Patent
Zrilic

(10) Patent No.: US 9,141,339 B2
(45) Date of Patent: Sep. 22, 2015

(54) DELTA-MODULATION SIGNAL PROCESSORS: LINEAR, NONLINEAR AND MIXED

(71) Applicant: Djuro Zrilic, Santa Fe, NM (US)

(72) Inventor: Djuro Zrilic, Santa Fe, NM (US)

( * ) Notice: Subject to any disclaimer, the term of this patent is extended or adjusted under 35 U.S.C. 154(b) by 0 days.

(21) Appl. No.: 13/694,560

(22) Filed: Dec. 12, 2012

(65) Prior Publication Data
US 2014/0159929 A1    Jun. 12, 2014

(51) Int. Cl.
*H03M 3/00* (2006.01)
*G06F 7/60* (2006.01)

(52) U.S. Cl.
CPC .................. *G06F 7/602* (2013.01)

(58) Field of Classification Search
CPC .......... G06F 7/602; G06F 7/605; H03M 3/00; H03M 3/02
USPC .............................................. 341/143, 76–77
See application file for complete search history.

(56) References Cited

U.S. PATENT DOCUMENTS

| | | | |
|---|---|---|---|
| 5,349,353 A | | 9/1994 | Zrilic |
| 5,585,716 A | * | 12/1996 | Gervais et al. ................. 324/142 |
| 6,137,429 A | * | 10/2000 | Chan et al. ..................... 341/143 |
| 6,285,306 B1 | | 9/2001 | Zrilic |
| 6,587,061 B2 | * | 7/2003 | Petrofsky ....................... 341/143 |
| 7,609,187 B2 | * | 10/2009 | Maezawa et al. ............. 341/143 |

OTHER PUBLICATIONS

Gorgon B. Lochart, Digital Encoding and Filtering Using Delta Modulation, The Radio and Electronic Enigneer, vol. 42, No. 12, Dec. 1972, pp. 574-551.
G. B. Lochart, S. P. Babary, Binary Transversal Filters Using Recirculating Shift Registers, The Radio and Electronic Engineer, vol. 43, No. 3, Mar. 1873, pp. 224-226.
Abraham Pelled, Bede Liu, A New Approach to Realization of Nonrecursive Digital Filters, IEEE Transaction on Audio and Electroacoustics, vol. AU-21, No. 6, Dec. 1973, pp. 477-484.
Abraham Peled, Bede Liu, A New Hardware Realization of Digital Filters, IEEE Transaction on Acoustics, Speech, and Signal Processing, vol. ASSP-22, No. 6, Dec. 1974, pp. 456-462.
D. Lagoyannis, Multiplier for Delta-Modulated Signals, Electronics Letters, Sep. 14, 1978, vol. 14, No. 19, pp. 615-616.
Joseph L. Locicero, Donald L. Schiling, Joseph Garodnick, Relization of ADM Arithmetic Signal Processors, IEEE Transaction on Communications, vol. COM-27, No. 8, Aug. 1979, pp. 1247-1254.
N. Kouvaras, Operations on Delta-Modulated Signals and their Applications in the Realization of Digital Filters, The Radio and Electronic Engineer, vol. 48, No. 9, Sep. 1978, pp. 431-438.
N. Kouvaras, A Special-Purpose Delta Multiplier, The Radio and Electronic Engineer, Vol. 50, No. 4, Apr. 1980, pp. 156-157.

(Continued)

*Primary Examiner* — Khai M Nguyen

(57) ABSTRACT

Disclosed are ten functional circuits for the direct processing (linear, nonlinear and mixed analog/digital) of a delta-modulated pulse stream. This invention comprising of; a digital circuit for squaring and rectification; a mix mode analog/digital squaring circuit; a digital circuit for AC-to-DC conversion; a mixed mode analog/digital multiplication circuit of two delta-sigma modulated pulse streams; a digital circuit for multiplication of two delta-sigma modulated streams; a digital circuit for RMS-t-DC conversion; a circuit for multiplication of delta-sigma modulated signal by a constant; a circuit for addition of three or more delta-sigma modulated pulse streams; and a correlator circuit of two delta-sigma modulated pulse signals.

9 Claims, 18 Drawing Sheets

(56) References Cited

OTHER PUBLICATIONS

N. Kouvaras, Some Novel Elements for Delta-Modulated Signal Processing, The Radio and Electronic Engineer, vol. 51, No. 5, May 1981, pp. 241-249.

N. Kouvaras, Novel Multi-Input Signal-Processing Networks with Reduced Quantization Noise, Int. J. Electronics, 1984, vol. 56, No. 3, pp. 371-378.

N. Kouvaras, J. Karakatsanis, A Technique for a Substantial Reduction of the Quantization Noise in the Direct Processing of Delta-Modulated Signals, Signal Processing, Elsevier Publishers, vol. 8, No. 1 Feb. 1985, pp. 107-119.

N. Kouvaras, Modular Network for Direct Complete Addition of Delta-Modulated Signals with Minimum Quantization Error, Int. J. Electronics, 1985, vol. 59, No. 5, pp. 587-595.

D. Lagoyannis, K. Pekmetzi, Multipliers of Delta-Sigma Sequences, The Radio and Electronic Engineer, vol. 51, No. 6, Jun. 1981, pp. 281-286.

DJ. Zrilic, K. Zangi, A. Mavertic, M. Freedman, Realization of Digital Filters for Delta-Modulated Signals, 30$^{th}$ Midwest Symposium on Circuits and Systems, Syracuse University, Aug. 16-18, 1987.

M. Freedman, DJ. Zirlic, Nonlinear Arithmetic Operations on the Delta Sigma Pulse Stream, Signal Processing, vol. 21, 1990, pp. 25-35.

D. G. Zrilic, Circuits and Systems Based on Delta Modulation (Book), Springer, 2005, ISBN 3-540-23751-8.

Ping Wah Wong, Robert M. Gray, FIR Filters with Sigma-Delta Modulation Encoding, IEEE Transaction on Acoustic Speech and Signal Processing, vol. 18, No. 6, Jun. 1990, pp. 979-990.

S. Horianopoulos, V. Anasrassopoulos, T. Deliyannis, Design Technique for Hardware Reduction in Delta Modulation FIR filters, Int. J. Electronics, 1991, vol. 71, No. 1, pp. 99-106.

David A. Johns, David M. Lewis, Design and Analysis of Delta-Sigma Based IIR Filters, IEEE Transaction on Circuits and Systems—II Analog and Digital Signal Processing, vol. 40, No. 4, Apr. 1993, pp. 223-240.

Charles Kitchin, Lew Counts, RMS to DC Conversion Application Guide, 2$^{nd}$ Edition, Analog Devices Inc., 1986, pp. 1-5.

D. Zrilic, "Circuit for Multiplication of Two Sigma-Delta Modulated Pulse Sreams", In the CD of 9$^{th}$ World Automation Congress, Sep. 19-23, 2010, Kobe, Japan, 5 pages.

* cited by examiner

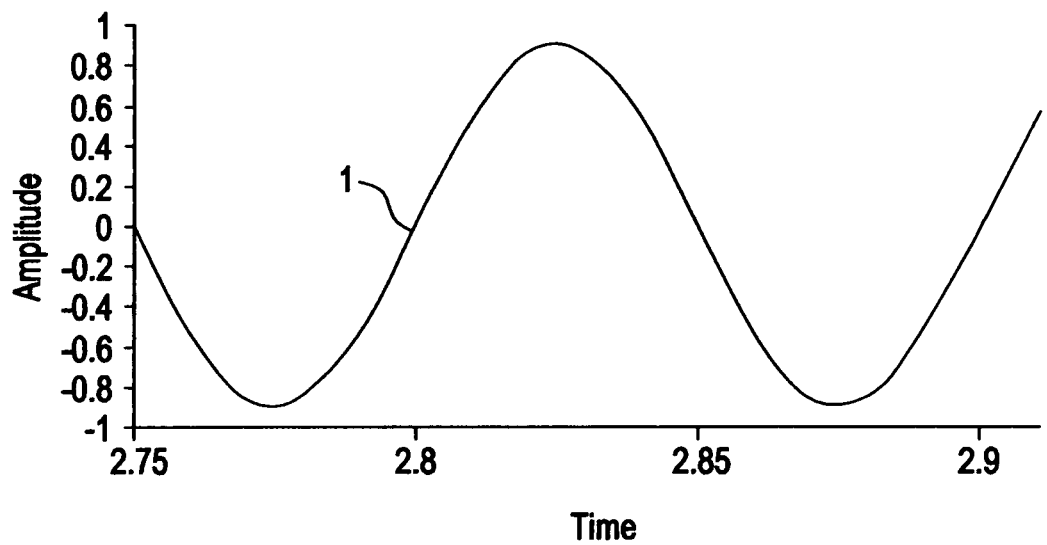
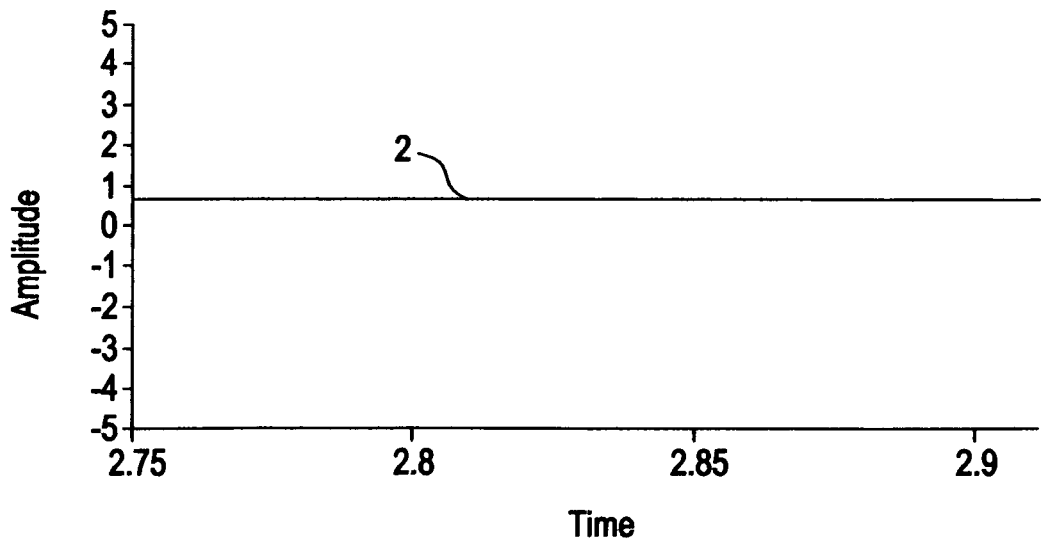

DELTA-MODULATION SIGNAL PROCESSORS: LINEAR, NONLINEAR AND MIXED

CROSS REFERENCES TO RELATED APPLICATIONS

None.

STATEMENT REGARDING FEDERALLY SPONSORED R&D

These research results are not sponsored by Government grants.

NAME OF PARTIES TO A JOINT RESEARCH AGREEMENT

None.

BACKGROUND OF THE INVENTION

1. Field of the Invention

The present invention relates to the direct processing of delta sigma modulated (DSM) and linear delta modulated (LDM) pulse streams. The sensing signal (analog input signal) is first converted into a one-bit high density (oversampled) pulse stream using DSM or LDM oversampled analog-to-digital converter. To implement a particular linear or nonlinear function, dedicated circuits have to be developed. Thus, the field of this invention is a pulse signal processing of one-bit non-positional delta modulated stream. It belongs to a wider class of digital signal processing (DSP) in the electrical engineering field.

2. Description of the Prior Art

The conventional method of DSP of a DSM pulse stream is achieved by using a decimation technique to interface with existing n-bit DSP hardware. Existing n-bit DSP hardware is bulky, power consuming, and prone to errors. Typical DSP hardware consists of a micro-processor and supporting n-bit communication lines with centralized control and synchronization. This hardware is not suitable for sub-micron technology because n-bit processors are hierarchical systems (every bit is weighted), and when the most significant bit (MSB), or sign bit is in error, a catastrophic malfunction can happen. To take advantage of the non-positional nature of a DSM pulse stream, there were several attempts to develop circuits for linear processing of a DSM pulse stream [U.S. Pat. No. 6,587,061 B2; U.S. Pat. No. 7,609,187 B2].

The earliest publications on the use of DSM in signal processing comes from Lockhart [1]. Digital filter coefficients are made of resistive networks. A similar idea is used by Lockhart and Babary [2] to implement an infinite impulse response (IIR) filter using a recalculating shift register. In both publications resistors are used to add filter coefficients.

Publications of Peled and Liu [3], [4] use ordinary DSP hardware to implement delta-modulated based digital filters. The implementation of filter coefficients is achieved using read-only memory (ROM).

In 1978 Lagoyannis [5] proposed a new method for multiplying delta-modulated signals by a constant. He implemented a digital circuit for direct multiplication of a delta modulated sequence.

In 1978, Locicero et al. [6] proposed a method for direct processing of adaptive delta-modulated (ADM) signals. By operating on the serial DM bit streams, sum, difference and product can be obtained in PCM and DM format. An arithmetic processor uses ordinary DSP hardware.

In the period 1978-1985, Kouvaras published a number of papers related to linear processing of a delta modulated stream. In reference [7] Kouvaras proposed a new method with which is possible to find a delta-modulated signal of the half sum of two analog signals through direct operation of their delta-modulated form. He proposed hardware implementation of a delta adder and did error analysis of the proposed circuit. In reference [8] Kouvaras proposes a digital circuit for doubling the amplitude of a delta modulated signal. In fact, by using a delta doubler, it is possible to overcome the problem of attenuation of one-half which the delta adder introduces [7]. In reference [9] Kouvaras proposed several circuits for the direct multiplication of delta-modulated signals by constants. In addition to a non-recursive form, Kouvaras proposed a recursive form of the multiplier. In reference [10] Kouvaras proposed a new modular multi-input network for direct arithmetic operation on DM signals. In reference [11] Kouvaras proposed a technique for the reduction of the quantization noise in the direct processing of a DM pulse stream. In reference [12] Kouvaras proposed the modular network for the direct addition of DM signals with minimum quantization noise.

Lagoyannis and Pekmestzi proposed multipliers of two DM sequences [13]. These multipliers provide the product in DM sequence form. These multipliers were used in the implementation of a parallel type of digital correlator.

In reference [14] Zrilic et al. proposed the implementation of a ternary delta adder and ternary delta multiplier for the implementation of digital filters. In reference [15] Freedman and Zrilic proposed a new algorithm for linear and non-linear processing of a DM pulse stream. In reference [16] Zrilic proposed a number of circuits for linear, nonlinear and direct processing of a DM pulse stream. In his patents (U.S. Pat. No. 5,349,353 and U.S. Pat. No. 6,285,306 B1), Zrilic disclosed the number of circuits for linear, nonlinear and mixed processing of a DSM pulse stream.

In reference [17] Wong and Gray present two methods for building FIR filters based on single-loop and two-stage DSM encoding. These filters do not require multipliers.

Horianoupulos et al. [18] proposed a design technique for hardware reduction in delta modulated FIR filters. This method takes advantage of the special characteristics of DM filters in order to reduce noise.

Johns and Lewis [19] designed and analyzed delta-sigma filters by eliminating all multi-bit multipliers through the use of re-modulating internal filter states.

BRIEF SUMMARY OF THE INVENTION

The present invention introduces a number of novel circuits for direct processing of DSM pulse stream. It is based on linear, nonlinear and mixed analog/digital processing using mainly digital circuitry. The present invention includes:
1. Method and apparatus for squaring operations (digital implementation),
2. Method and apparatus for squaring operations (mixed analog/digital implementation),
3. Method and apparatus for DSM based alternate current to direct current (AC-DC) conversion,
4. Method and apparatus for multiplication of two DSM pulse streams (mixed implementation),
5. Method and apparatus for multiplication of two or more DSM streams (digital implementation),
6. Method and apparatus for root mean square to direct current (RMS-to-DC) conversion, 7. Method and apparatus for multiplication of a DSM stream with a constant,
8. Method and apparatus for addition of multiple DSM sequences,
9. Method and apparatus for correlation of two DSM sequences, and
10. DSM System on Chip (SoC).

It is therefore a primary objective of the present invention to provide a number of circuits necessary for DSP of DSM pulse streams.

It is another objective of the present invention to provide simple and reliable circuits which will significantly enhance applications of DSM signal processing in different application areas.

It is still another objective of the present invention to reduce power consumption of DSM processing elements in applications where power consumption is a critical factor.

It is still a future objective of the present invention to provide a simple and inexpensive very large scale integration (VLSI) design.

It is still a future objective to design the system on a chip (SoC) which includes multiplexed sensors array, DSM analog to digital converter (ADC) and newly proposed circuitry for functional processing of DSM pulse stream.

DETAILED DESCRIPTION OF THE INVENTION

Definition

Figure 1A:
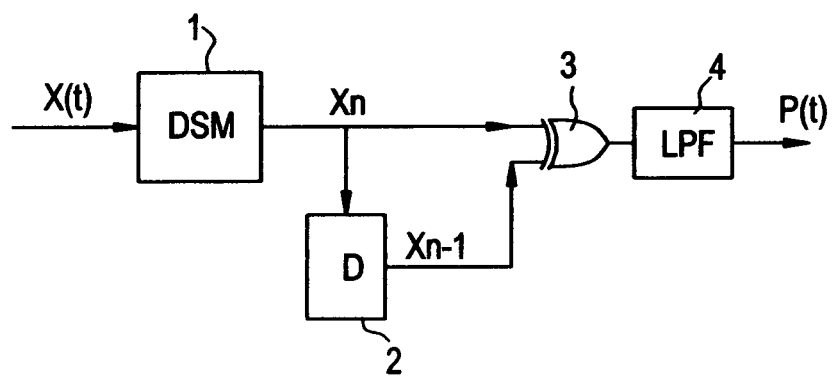
FIG. 1A shows a block diagram, with supporting waveforms of operation, of a DSM circuit for the squaring operation of an analog input signal (digital implementation) as shown in FIGS. 1C, 1D and 1E.

Linear circuit networks are networks where linear network laws can be applied (addition, subtraction, multiplication by a constant, superposition, etc.). Nonlinear circuits are theoretical and implementation-specific and one is not able to apply linear network theory to these circuits; the same holds for mixed circuits.

Best Mode of Invention

Ten block diagrams of circuits are presented; herein shall be presented the best mode contemplated by the inventor.

How to Make the Invention

As can be amply seen from the drawings, every circuit presents an independent invention. Thus, it is necessary to describe every invention separately.

Figure 1B:
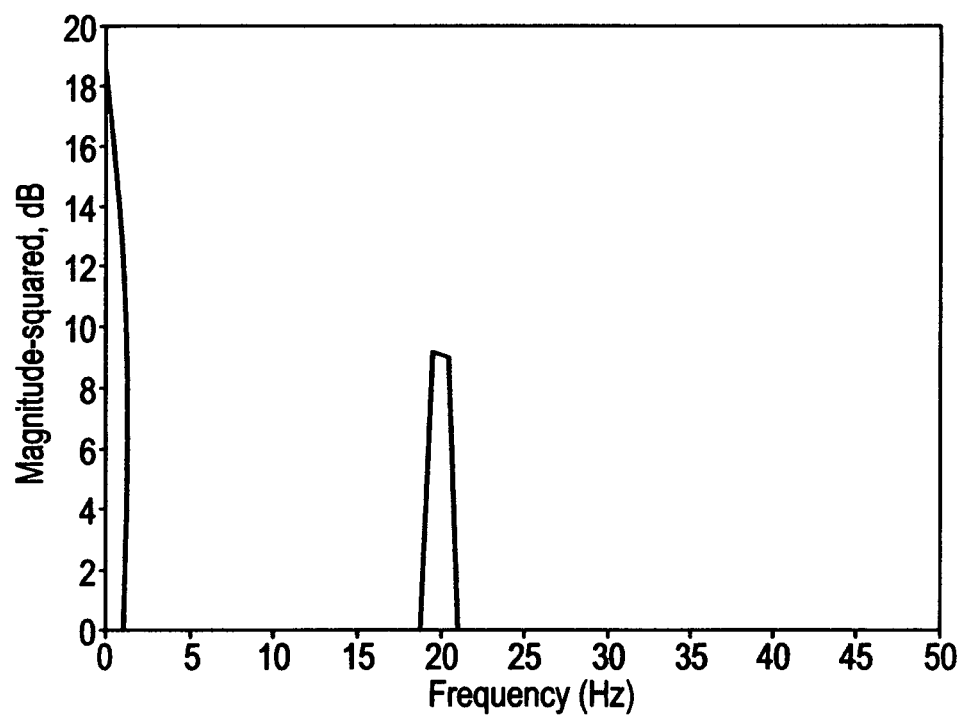
FIG. 1B shows the frequency spectra of the signal in FIG. 1D.
Figure 1C:
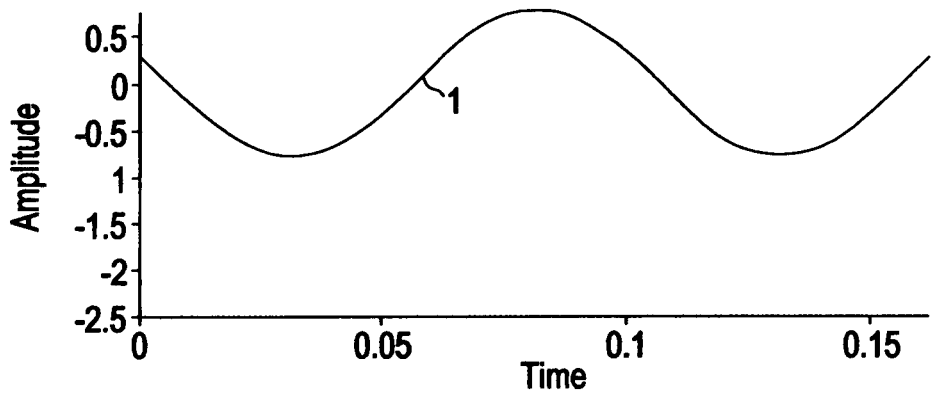
Figure 1D:
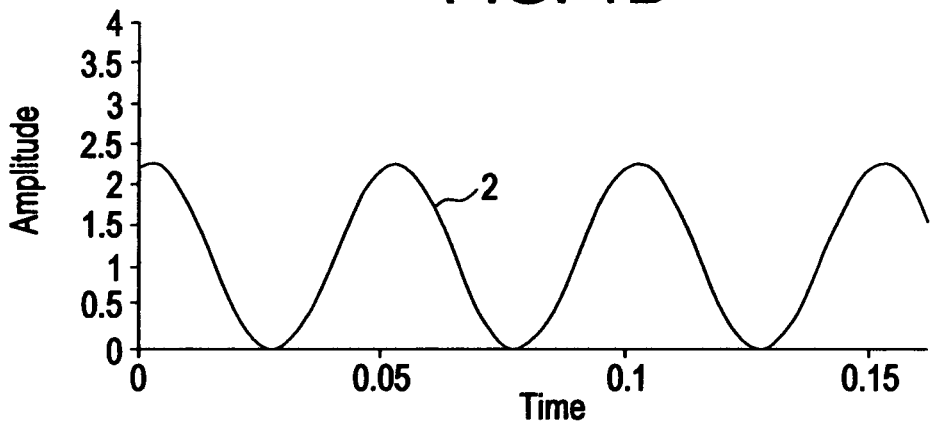
Figure 1E:
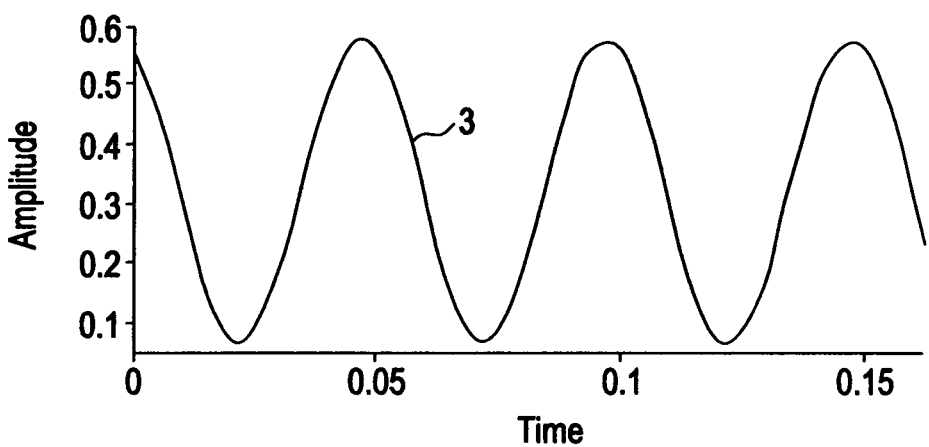

FIG. 1A shows a block diagram of a digital squaring circuit of a delta-sigma modulated signal. This block diagram includes DSM 1, delay stage 2, logic gate 3, and low-pass filter 4. Its operation is as follows: Analog input signal x(t) is first delta-sigma modulated in 1. Binary sequence $X_n$ is delayed for one clock pulse in 2, to produce binary sequence $X_{n-1}$. Both sequences are inputted into exclusive logic gate 3 (XOR). The output of 3 is fed into low-pass filter (LPF) 4 to produce analog signal p(t). FIG. 1B shows the spectra of squaring operation when sinusoidal signal of frequency of 10 Hz is squared. The resulting spectrum consists of a DC component and an AC component located at double input frequency of 20 Hz [$(\sin \omega t)^2 = (1 - \cos 2\omega t)/2$]. FIG. 1C shows analog input signal x(t) (1). FIG. 1D shows theoretical waveform (2) of squaring operation, and FIG. 1E shows result of squaring operation (3) when output of 3 is low-pass filtered in 4, to produce p(t). The circuit in FIG. 1A can be used as a rectifier of analog signal x(t) as well. In this case cut-off frequency of LPF 4 has to be much higher than cut-off frequency of LPF used for squaring operation.

Figure 2A:
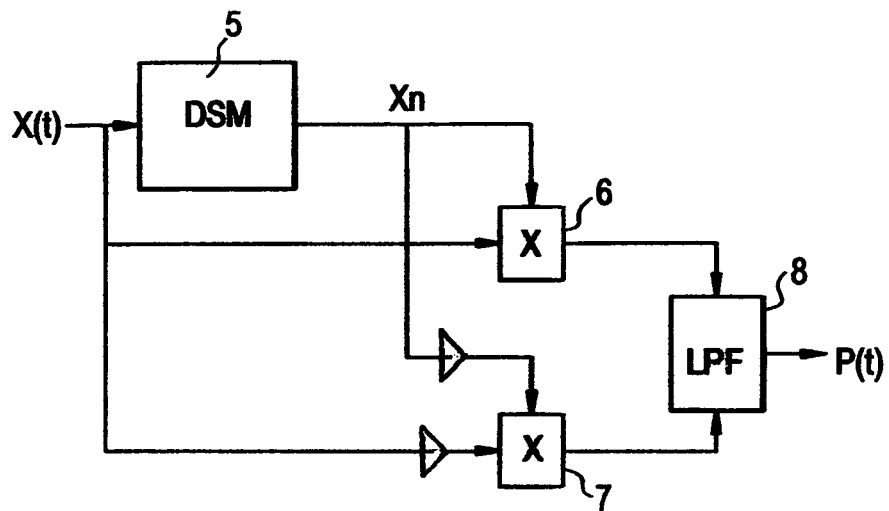
FIG. 2A shows a block diagram, with supporting waveforms of operation, of a DSM system for the squaring of an input analog signal (mixed analog/digital implementation) as shown in FIGS. 2C, 2D and 2E.
Figure 2B:
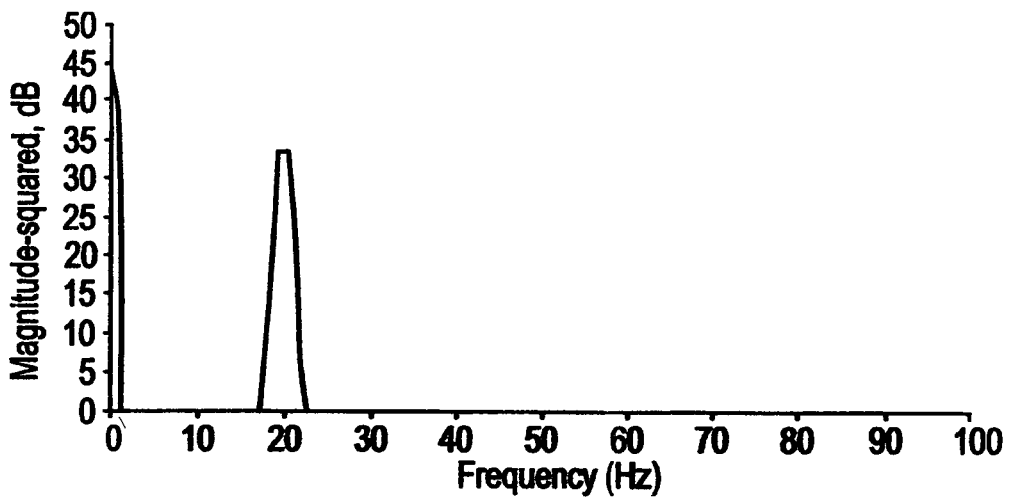
FIG. 2B shows the frequency spectra of the signal in FIG. 2D.
Figure 2C:
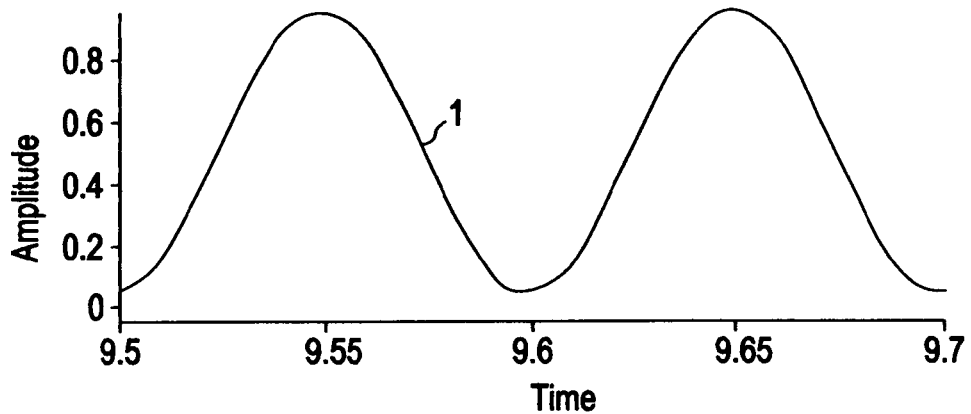
Figure 2D:
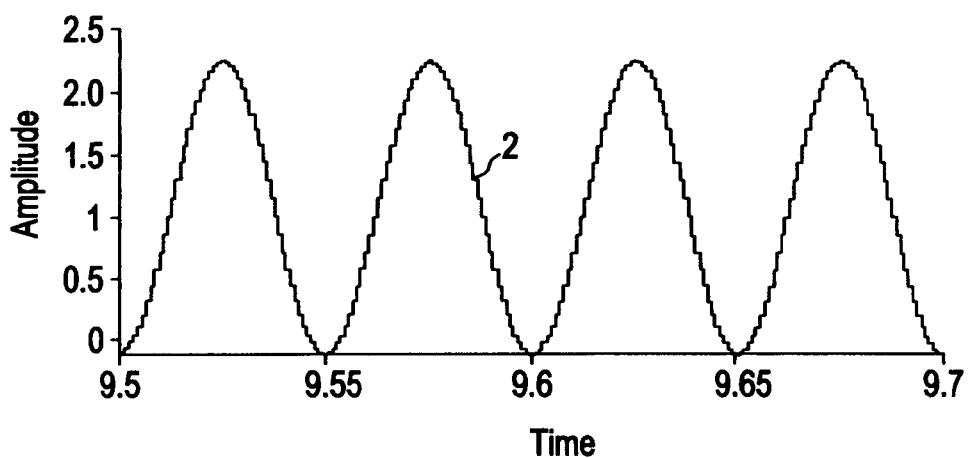
Figure 2E:
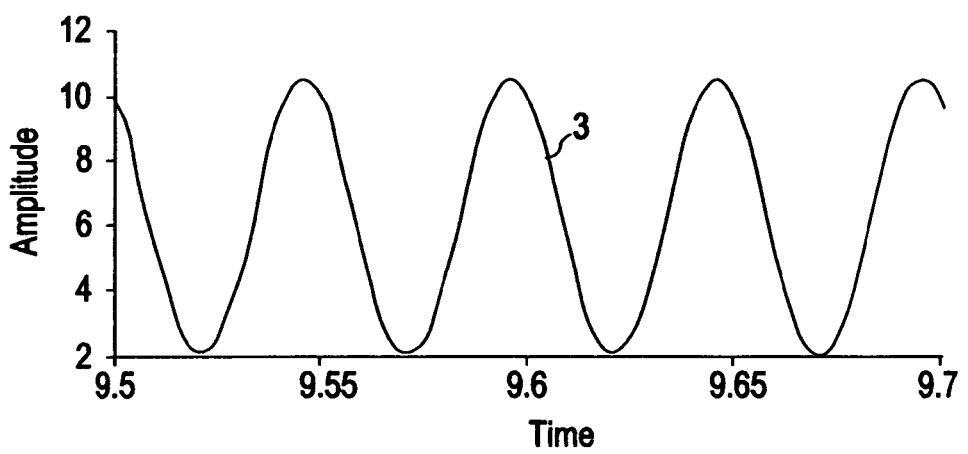

In FIG. 2A a block diagram for mix mode analog/digital processing of DSM pulse stream is shown. This system includes DSM 5, two switching multipliers 6 and 7, and LPF 8. Analog input signal x(t) is converted into binary pulse stream $X_n$ by means of DSM 5. $X_n$ is multiplied in 6 by non-inverted input x(t). Inverted input of x(t) is multiplied by inverted bit stream of $X_n$ in 7. Outputs of switching multipliers 6 and 7 are added and fed into LPF 8. FIG. 2B shows spectral locations of squared 10 Hz sinusoidal waveform. It can be seen a DC component at zero and an AC component at 20 Hz. FIG. 2C shows 10 Hz sinusoidal input, waveform (1). FIG. 2D shows theoretical square of input, waveform (2), and FIG. 2E shows result of simulation, waveform (3). We can see good agreement between theory and simulation.

Figure 3A:
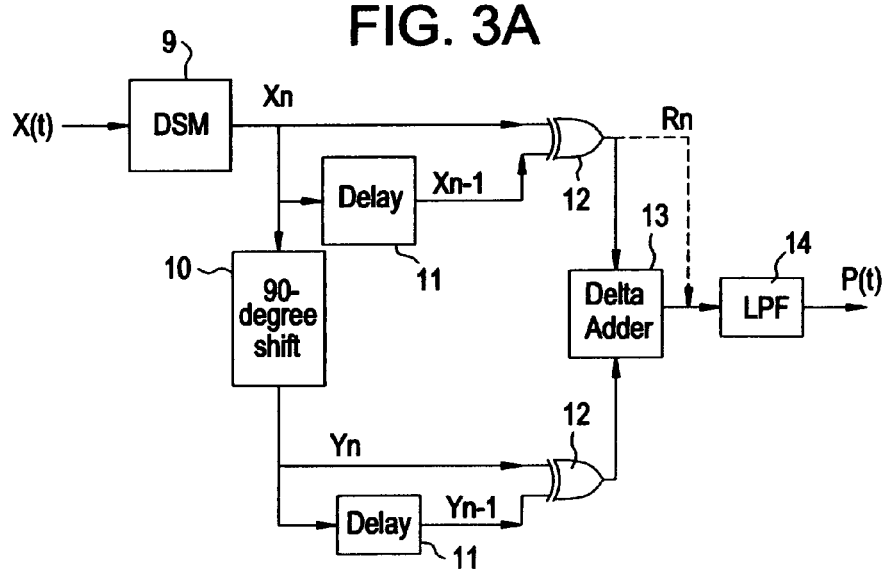
FIG. 3A shows a block diagram, with supporting waveforms of operation, of a DSM system for AC-DC conversion (digital implementation) as shown in FIGS. 3B and 3C.
Figure 3B:
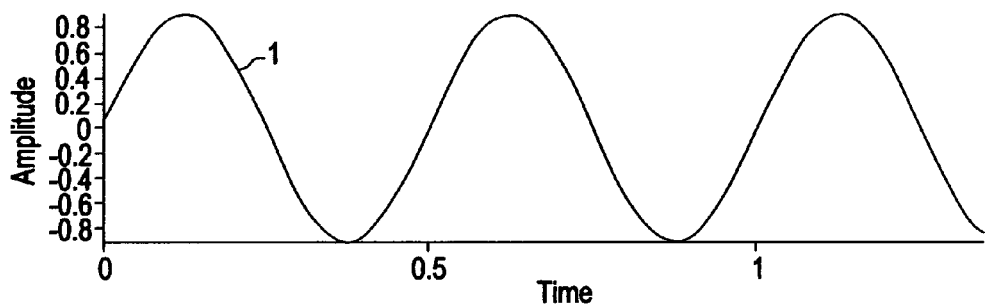
Figure 3C:
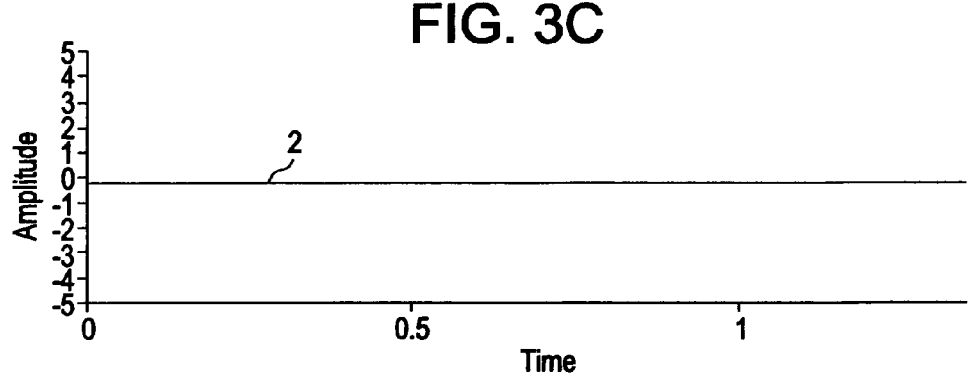

FIG. 3A shows digital implementation of AC-to-DC conversion circuit of analog input signal x(t). Sinusoidal analog signal x(t) is converted in DSM 8 to binary pulse stream $X_n$. $X_n$ is shifted by 90° degrees to obtain digital signal $Y_n$. Both signals, $X_n$ and $Y_n$, are fed into identical squaring (rectifying circuit) which consists of identical logic elements 11 and 12. This circuit is described in paragraph (0029). Outputs of XOR gates, 12, are fed into delta adder 13. The output of 13 is fed into LPF 14 to obtain DC signal p(t). Because $X_n$ is a digital representation of sinus signal and $Y_n$ of cosine signal after nonlinear operation DC signal is obtained, because $(\sin \omega t)^2 + (\cos \omega t)^2 = 1$. Here $\omega$-represents frequency of AC signal, and 1 on right-hand side represents DC signal. If a cut-off frequency of LPF 14 is much lower than the lowest frequency of interest of input signal, shown in FIG. 3B, waveform (1) then only output of rectified signal $X_n$ (which is $R_n$) can be fed into LPF 14, by-passing delta adder, to obtain DC signal (2) shown in FIG. 3C.

Figure 4A:
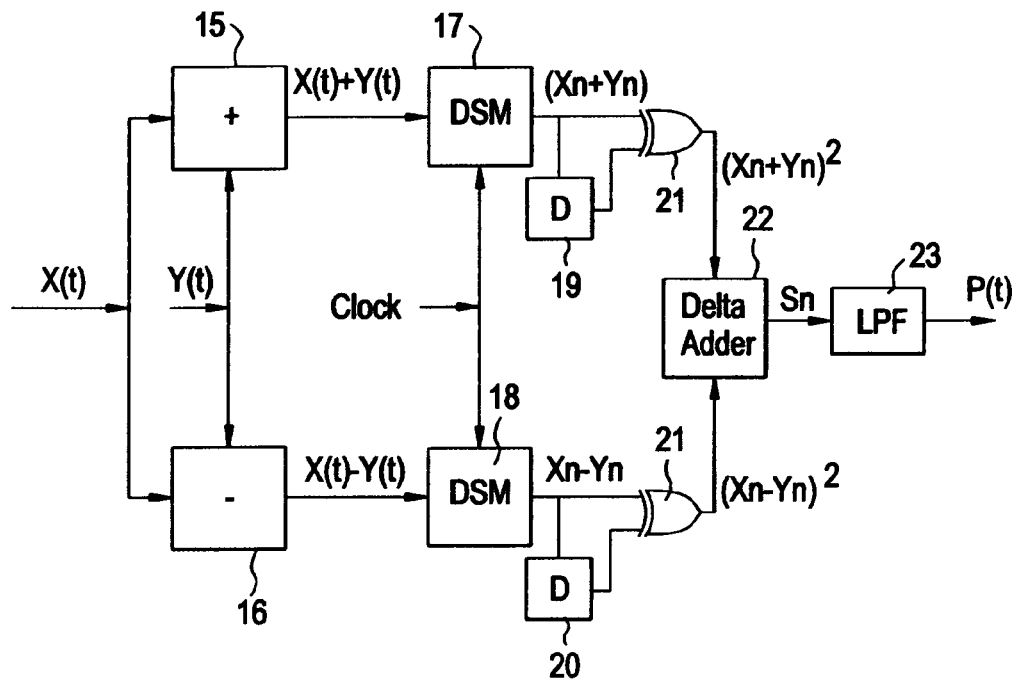
FIG. 4A shows a block diagram, with supporting waveforms of operation, of a DSM system for multiplication of two analog signals (mixed analog/digital implementation) as shown in FIGS. 4C and 4D.

FIG. 4A shows a block diagram of the invention for the multiplication of two signals. Input analog signals x(t) and y(t) are added in 15 and subtracted in 16, then sum and difference of x(t) and y(t) are converted by synchronous delta modulators DSM 17 and DSM 18 to produce digital pulse streams $(X_n+Y_n)$ and $(X_n-Y_n)$ respectively. These two streams are then squared (according to the invention in FIG. 1A) and added to produce digital pulse stream $S_n=X_nY_n$. After LPF 23 signal p(t)=kx(t)y(t) is produced. Operation of the circuit in FIG. 4A is based on the algorithm:

$$[x(t)+y(t)]^2 - [x(t)-y(t)]^2 = 4x(t)y(t)$$

A sum of two delta-modulated sequences is defined by Kouvaras [7] as $$S_n = 1;2[X_n+Y_n] + \text{quantization error}$$

For properly oversampled DSM this error can be neglected. Thus, according to embodiment in FIG. 4A we can write for output $S_n$ of delta adder 22

$$S_n = \tfrac{1}{2}[X_n+Y_n]^2 - \tfrac{1}{2}[X_n-Y_n]^2 = 2X_nY_n$$

Figure 4B:
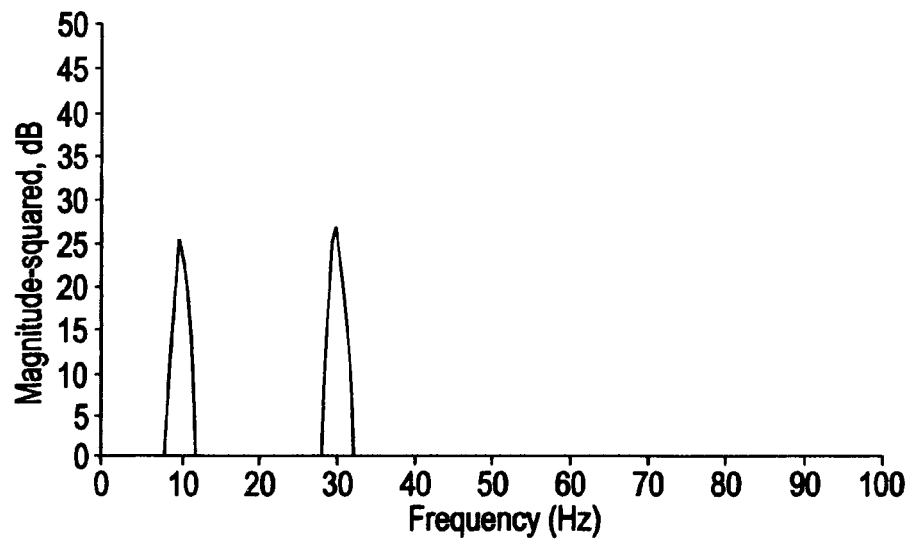
FIG. 4B shows the frequency spectra of the signal in FIG. 4D.
Figure 4C:
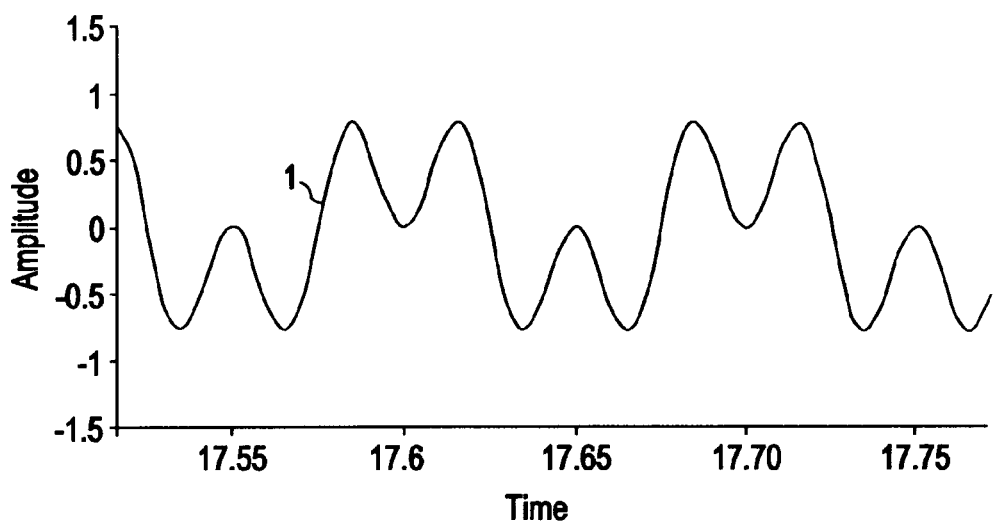
Figure 4D:
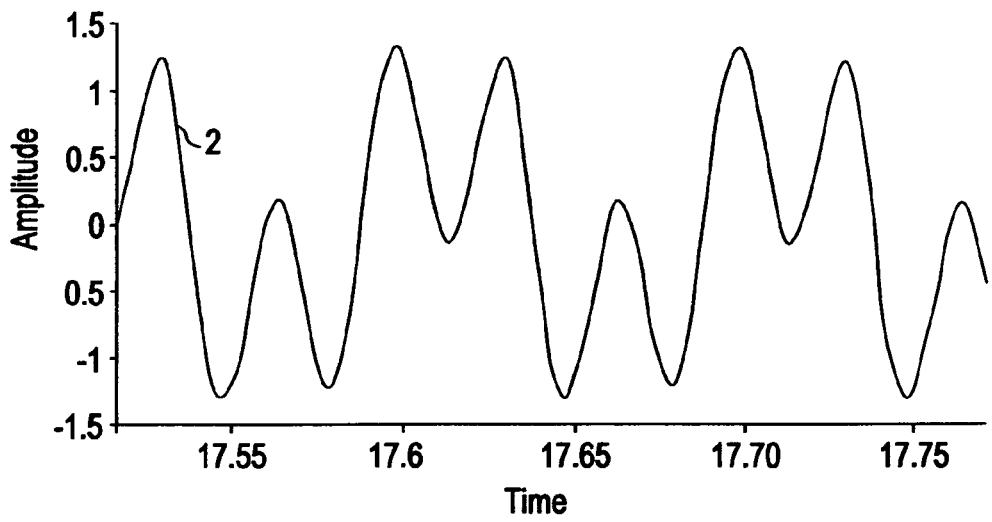

Delta adder introduces attenuation of 0.5, and in addition, the amplitude of demodulate signal p(t) depends on cut-off frequency and attenuation of LPF 23 as well. Time waveforms of the multiplication of two sinusoidal signals with frequencies $f_1=10$ Hz and $f_2=20$ Hz are shown in FIG. 4C and FIG. 4D. Signal (1), in FIG. 4C, is the theoretical multiplication and signal (2), in FIG. 4D, is the simulated one. In FIG. 4B we can see two spectral components located at the $(f_1+f_2)=30$ Hz, and difference of two frequencies, $(f_1-f_2)=10$ Hz, because of identity $[\sin \omega_1 t \ast \sin \omega_2 t = \tfrac{1}{2}\cos(\omega_1-\omega_2)t - \tfrac{1}{2}\cos(\omega_1+\omega_2)t]$. The same circuit can be used for the squaring operation when x(t)=y(t). Invention in FIG. 4A presents hybrid analog/digital solution for multiplication of two analog signals using DSM.

Figure 5A:
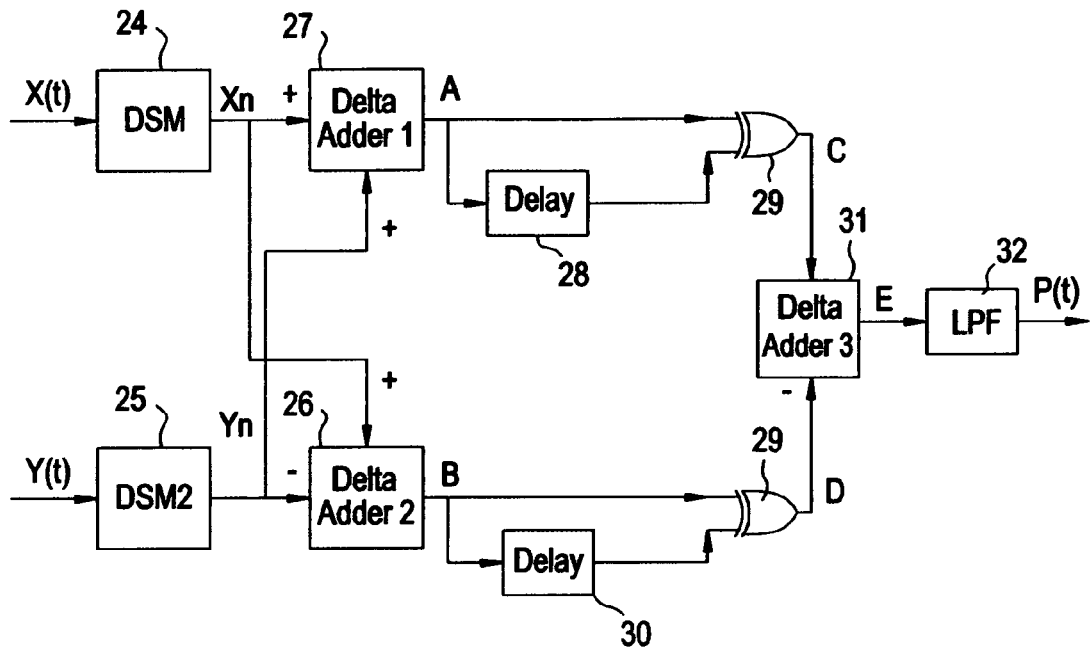
FIG. 5A shows a block diagram, with supporting waveforms of operation, of a DSM system for the multiplication of two analog signals (digital implementation) as shown in FIGS. 5C and 5D.
Figure 5B:
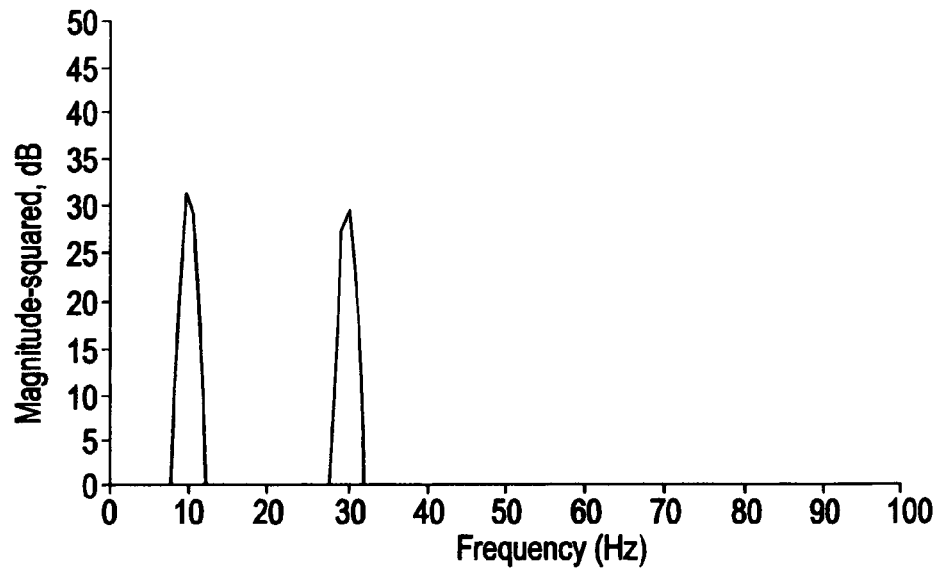
FIG. 5B shows the frequency spectra of the signal in FIG. 5D.
Figure 5C:
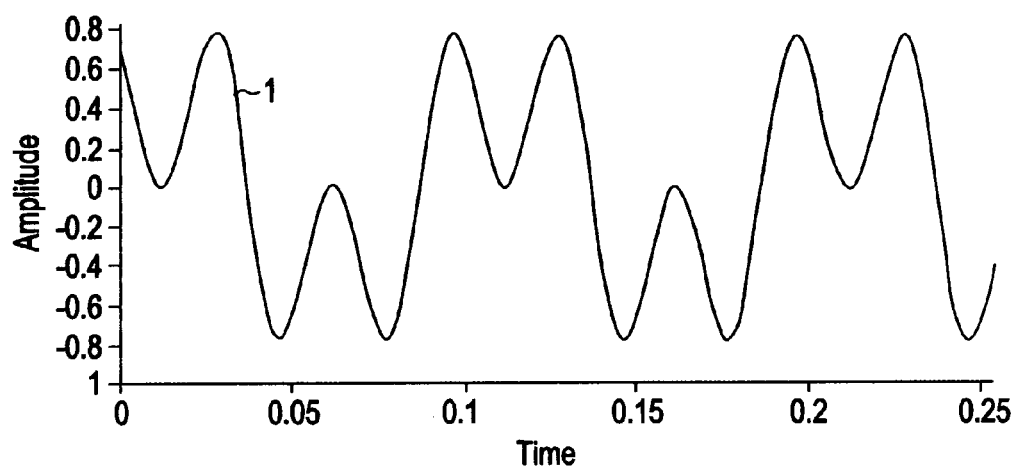
Figure 5D:
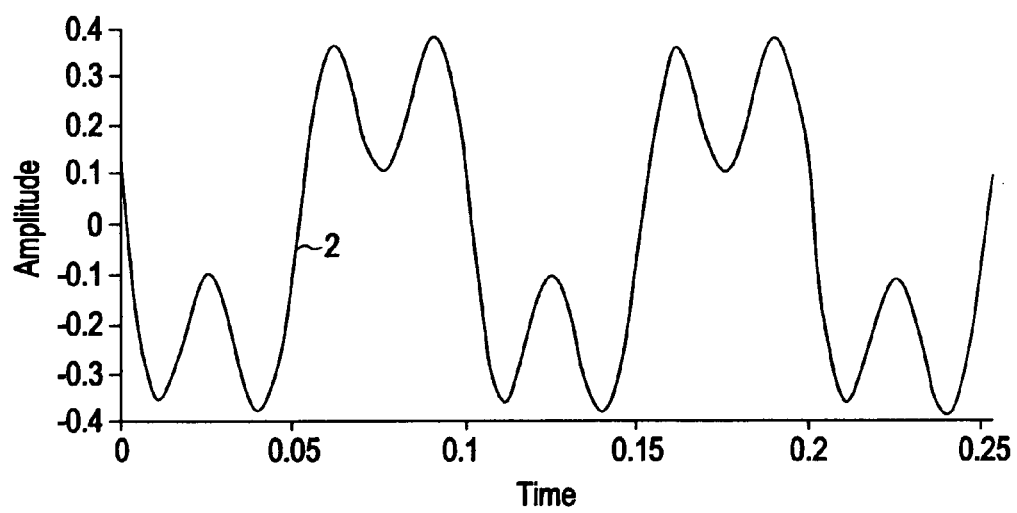

FIG. 5A shows the block diagram of a digital implementation for the multiplication of two delta-modulated pulse streams A and B. Analog input signals x(t) and y(t) are converted by synchronous delta modulators DSM 24 and DSM 25 to produce $X_n$ and $Y_n$ DSM sequences. These signals are added and subtracted to produce signals $A=\tfrac{1}{2}[X_n+Y_n]$ and $B=\tfrac{1}{2}[X_n-Y_n]$ respectively. After the squaring operation (according to the invention in FIG. 1A), signals $C=\tfrac{1}{4}[X_n+Y_n]^2$ and $D=\tfrac{1}{4}[X_n-Y_n]^2$ are produced and subtracted in delta adder 31 to produce signal $E=C-D=X_nY_n$. This signal is demodulated, LPF 32, and the signal p(t)=x(t)y(t) is obtained. Time waveforms are shown in FIG. 5C and FIG. 5D. Signal (1), in FIG. 5C, is theoretical, produced by multiplying two sinusoidal signals with frequencies of $f_1=10$ Hz and $f_2=20$ Hz. Signal (2), in FIG. 5D, is the result of simulation. Spectral content is shown in FIG. 5B, where one frequency component is located at frequency 10 Hz, which is the difference of $f_2-f_1$, and second component is located at 30 Hz which is the sum of $f_2+f_1$. The same circuit can be used for the squaring operation when x(t)=y(t). Embodiment in FIG. 5A presents digital implementation solution for multiplication of two analog input signals, with different or the same amplitudes or frequencies.

RMS or Root Mean Square is a fundamental measurement of the magnitude of an alternate current (AC) signal. Its mathematical definition is:

$$V_{rms} = \text{square root of [average }(V^2)]$$

This formula involves squaring the signal, taking the average, and obtaining the square root. The averaging time must be sufficiently long to allow filtering at the lowest frequencies of the operation desired.

Figure 6A:
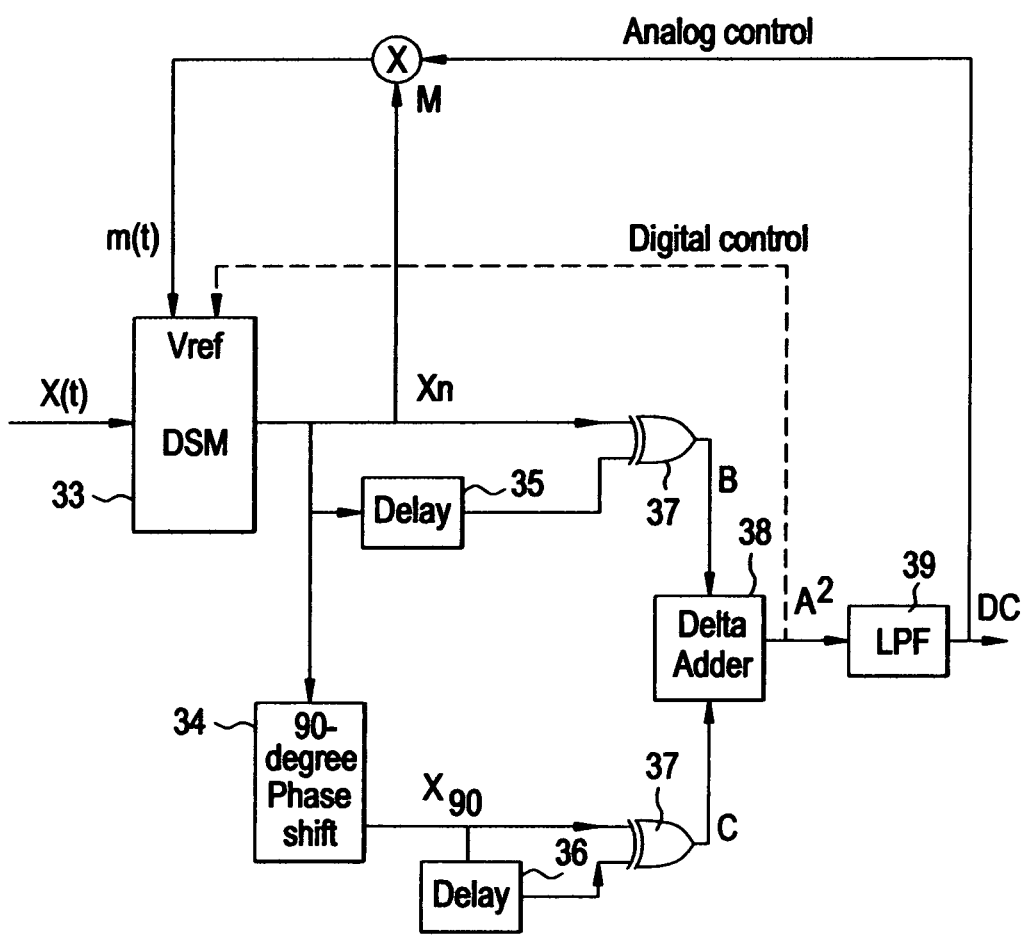
FIG. 6A shows a block diagram, with supporting waveforms of operation, of a DSM system for RMS-DC conversion (digital implementation) as shown in FIGS. 6B and 6C.

In FIG. 6A the invention for root mean square-to-direct current (RMS-to-DC) conversion is shown. This invention enables three different implementation approaches:

1. Signal x(t) is delta modulated in DSM 33 and its output sequence $X_n$ is AC-DC converted by means of the invention of FIG. 3A to produce signal $A^2$. The output of LPF 39 is switched by $X_n$ in switching multiplier M. The output signal of switching multiplier m(t) is fed into $V_{ref}$ input of DSM 33.

2. Alternatively, it is also possible to feed back the digital output B of gate 37, connecting it directly to LPF 39. In this case implementation becomes much simpler, by-passing delta adder 38, phase shifter 34 and logic gates 36 and 37 of output C. In this way output B of 37 produces required squaring (rectifying operation), output of LPF 39 produces average (DC), and switching multiplier produces reference input signal m(t). According to theory and reference [20] it is possible to show that $$X_{DC} = [\text{Average}(X_{in}^2)]/X_{DC}, \text{ thus } X_{DC} = \text{square root[Average}(X_{in}^2)].$$

3. Because DSM 33 is an analog system (continuous or discrete) it is natural to integrate switching multiplier M and LPF 39 as an integral part of DSM. In this case digital output $A^2$ or B can be fed back directly to DSM 33 for internal creation of $V_{ref}$ signal. Integrating digital logic with DSM hybrid IC circuit can be obtained. In this case only external component of IC chip is capacitor C of LPF.

Simulation results in FIG. 6B are generated using second approach. Digital output B of XOR gate 37 is fed directly to LPF 39. Its DC output is fed into switching multiplier M to produce reference signal m(t). In FIG. 6B signal (1) presents the AC input signal and signal (2), in FIG. 6C, presents the demodulated RMS-DC value. In this example amplitude of input signal is $V_{pk}=0.9V$ which corresponds to theoretical RMS value of 0.6363 ($V_{rms}=0.707V_{pk}=0.6363V$). From FIG. 6C we can see a good agreement of simulation results with theory.

Figure 7A:
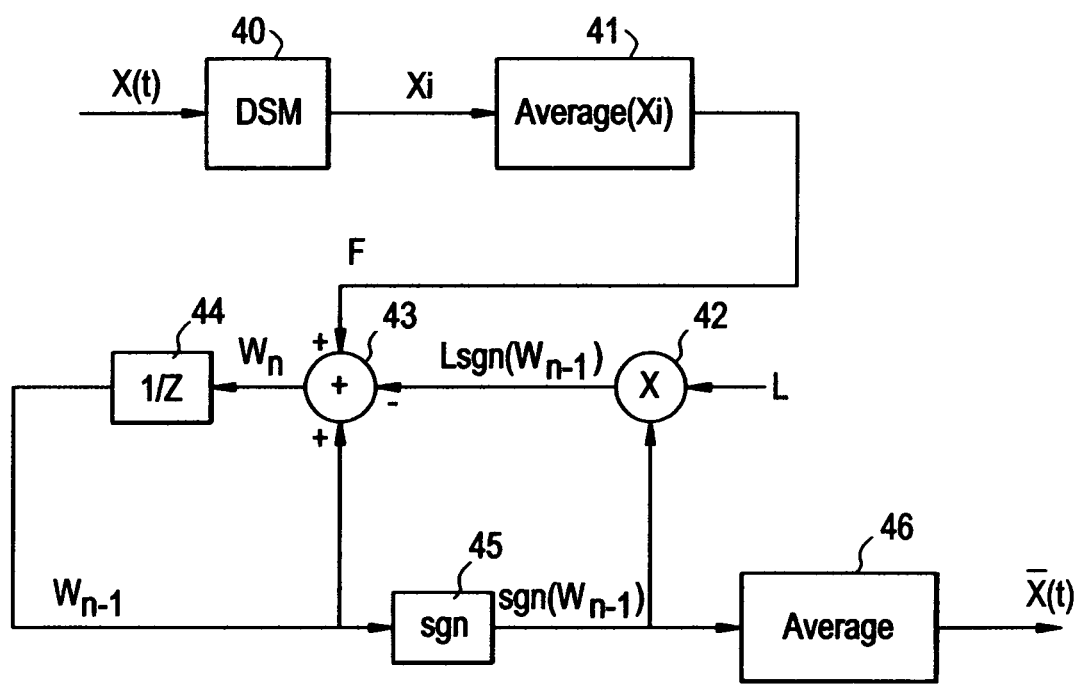
FIG. 7A shows a block diagram, with supporting waveforms of operation, of a DSM system for the multiplication of a DSM pulse sequence with a constant greater or less than one (digital implementation) as shown in FIG. 7B.
Figure 7B:
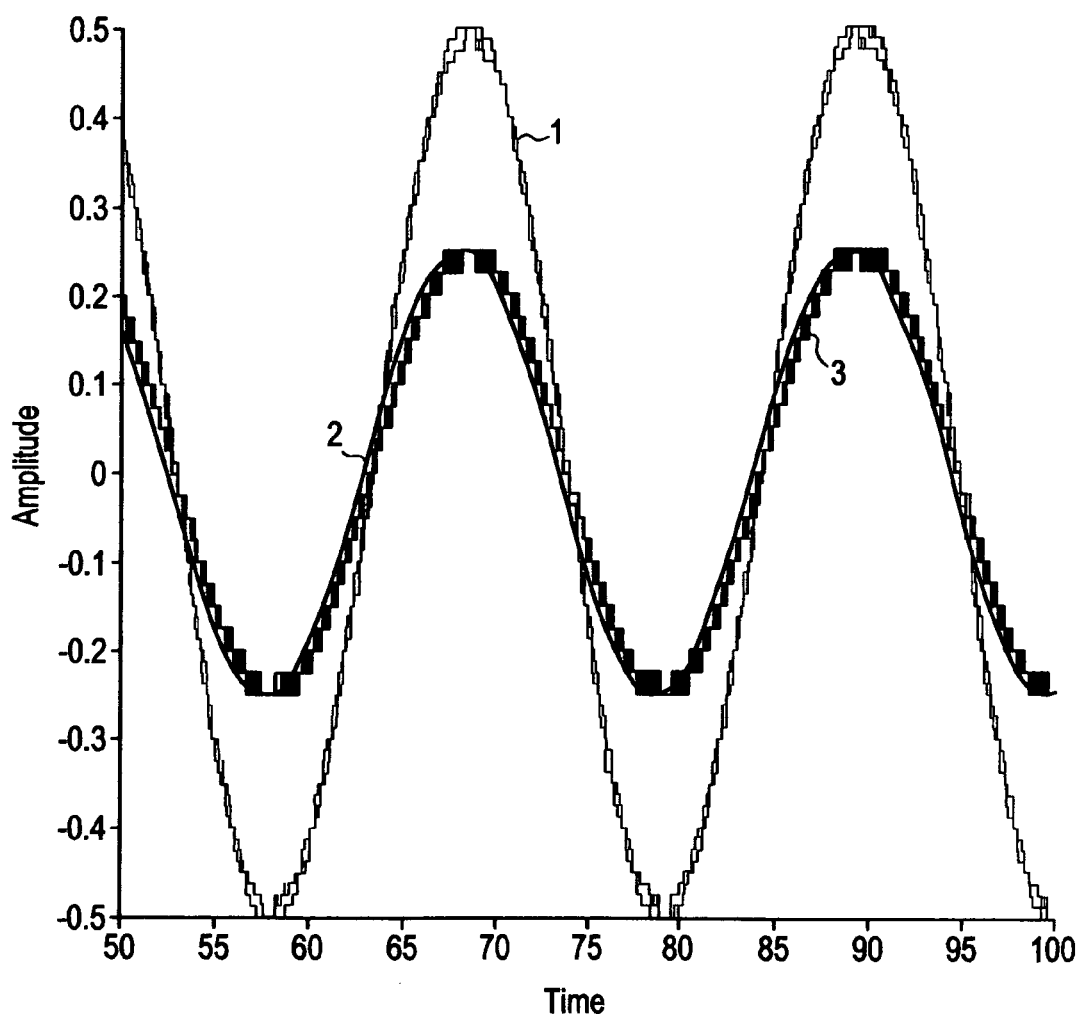

FIG. 7A shows the universal apparatus for the multiplication of a DSM sequence by a constant greater than one and a constant less than one. The output of delta modulator $X_i$ is first averaged in 41. The output of the averager 41, signal F, is added according to the algorithm, $W_n=W_{n-1}+F-L\text{sgn}W_{n-1}$, where L is a multiplication constant. If $X_i$ has to be multiplied by two, then $L=\tfrac{1}{2}$. If $X_i$ has to be divided by two, then $L=2$. After averaging 46, the demodulated signal $\overline{x(t)}$ is obtained. Corresponding waveforms are shown in FIG. 7B. Waveform (1), signal $\overline{x(t)}$, is the amplified analog input x(t), signal (2). Waveform (3) is the demodulated DSM sequence $X_i$ (non-amplified). We can see a good agreement between input (2) and demodulated (3) signals.

Figure 8A:
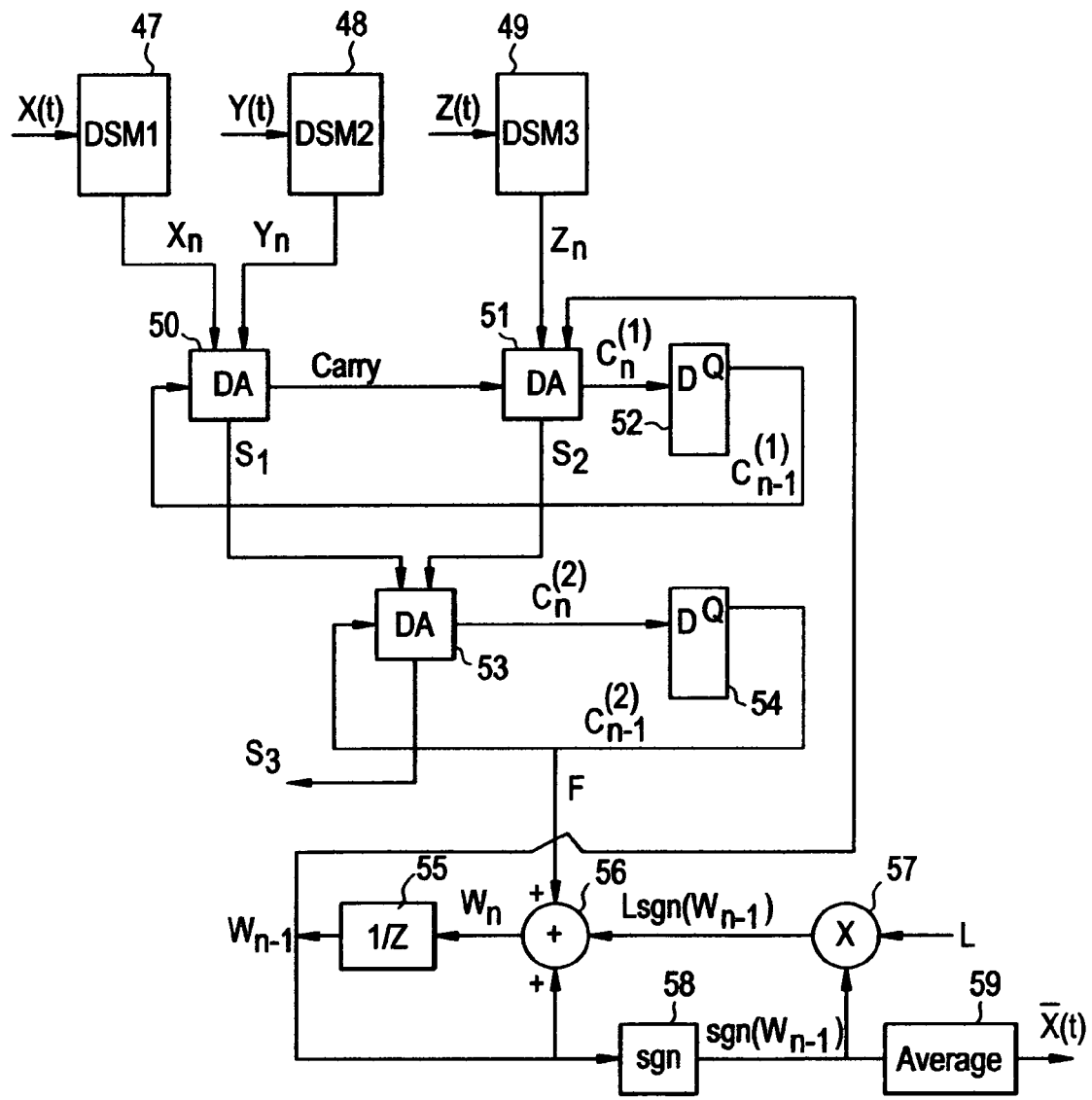
FIG. 8A shows a block diagram, with supporting waveforms of operation, of a DSM system for the addition of three or more DSM modulated pulse streams (digital implementation) as shown in FIGS. 8B and 8C.
Figure 8B:
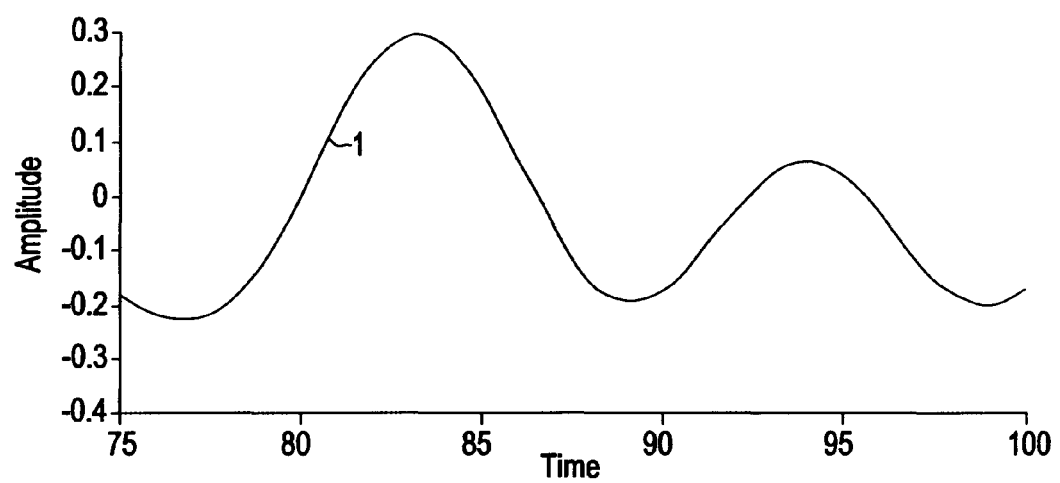
Figure 8C:
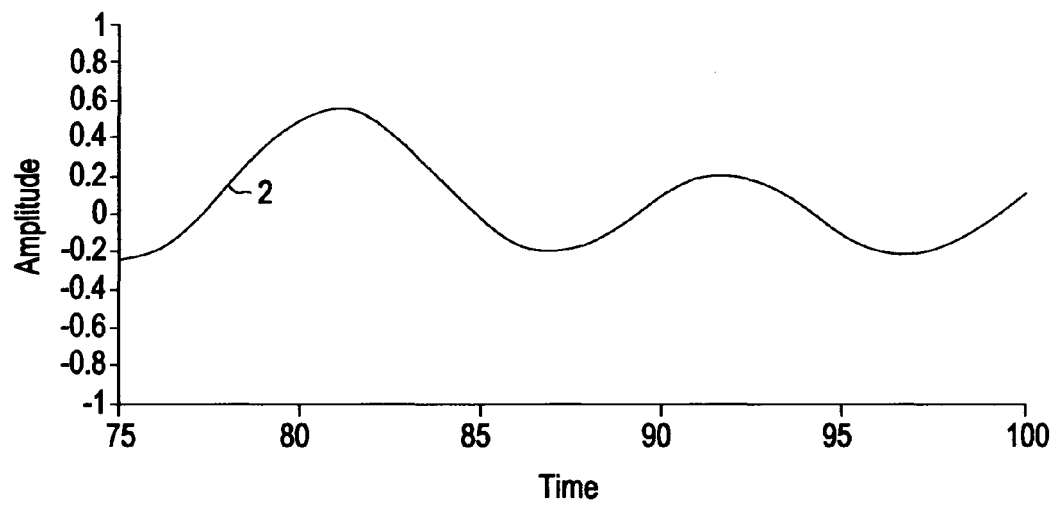

The invention in FIG. 8A is related to the addition of three or more DSM sequences. This invention overcomes the attenuation of a cascade of delta adders [1]. FIG. 8A shows the case of the addition of three signals. Input signals are first DSM converted to produce sequences $X_n$, $Y_n$, and $Z_n$ by means of delta sigma modulators 47, 48, 49 respectively. Sequences $X_n$ and $Y_n$, are added in the delta adder to produce sequence $S_1$. The last sequence $Z_n$ is added to feed-back sequence $W_{n-1}$. This is done to overcome the cascaded attenuation of two delta adders. In the case of an odd number of adders in the first layer, the second input of the last adder is terminated with idle sequence $I_0$. Idle sequence $I_0$ consists of periodic stream of minus one and plus one (...−1, +1, −1, +1, −1,...). After averaging of idle sequence the result is always zero. It is important to note that every level has only one D-FF for the generation of $C_{n-1}$, the carry-out signal. In this example there are two levels of addition. The first level produces $C_{n-1}^{(1)}$, and the second level produces $C_{n-1}^{(2)}$. The outputs of D-FF 52 and 54 are fed back to delta adders 50 and 53 respectively. Waveform (1), in FIG. 8B, is the theoretical addition of three signals of different frequencies $f_1=3$ Hz, $f_2=2$ Hz and $f_3=0.6$ Hz), and waveform (2), in FIG. 8C, presents the simulated result. We can see a good agreement between theory and simulation results.

Figure 9:
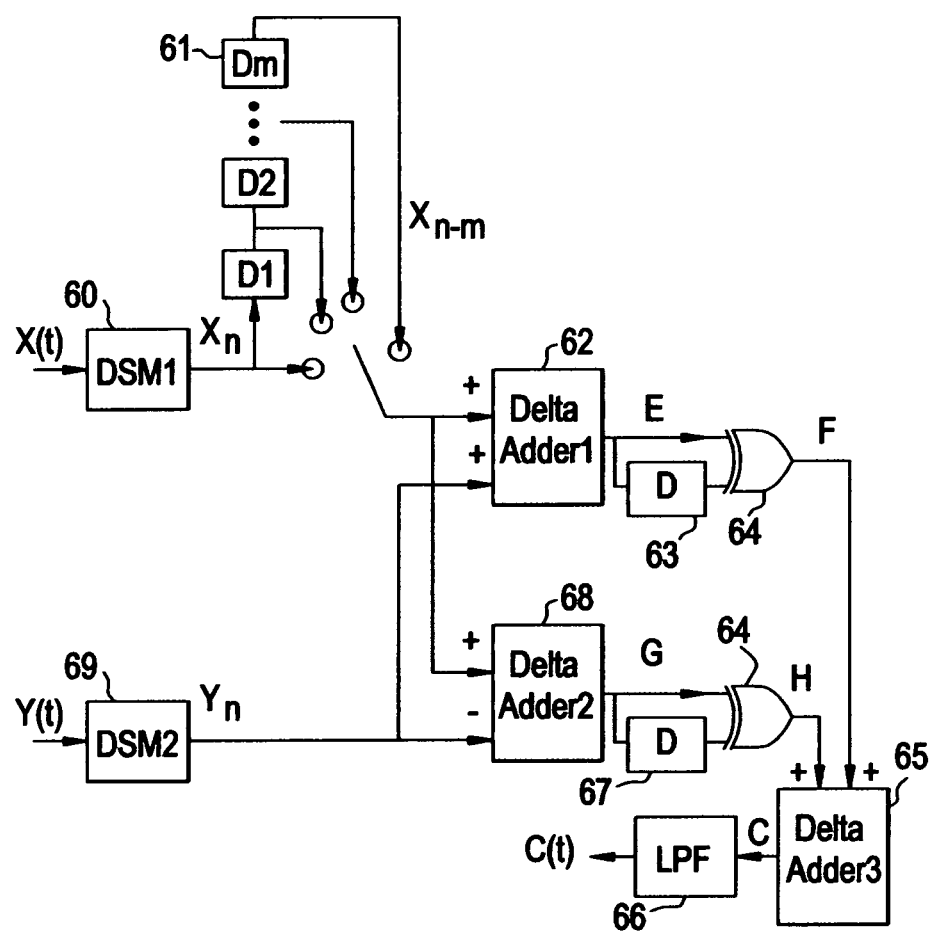
FIG. 9 shows a proposed block diagram of a DSM system for the correlation of two analog input signals (digital implementation).

FIG. 9 shows a block diagram of a DSM based correlator. The digital correlator is based on the direct processing of DSM streams $X_n$ and $Y_n$. The sum and difference of sequences is processed in delta adders 62 and 68. The outputs of delta adders E and G are squared (using invention circuit in FIG. 1A) to produce sequences F and H. The sum of squares, C=F+H, is demodulated in 66 to produce correlated signal c(t). The delay line is adjusted electronically to achieve maximum correlation. This correlator employs only one filter which is a significant savings as compared to classic correlators.

Figure 10:
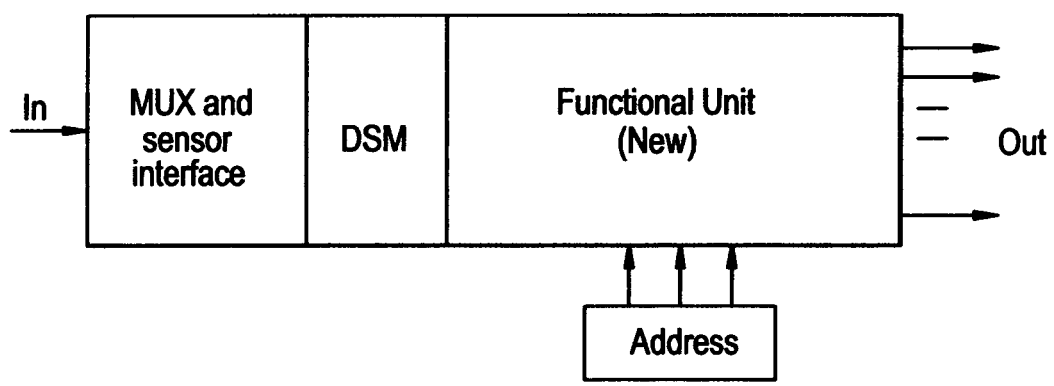
FIG. 10 shows a block diagram of a multi-purpose DSM IC chip.

FIG. 10 shows a multi-purpose integrated circuit (IC) which incorporates relevant functions for the direct processing of a DSM pulse stream (linear, nonlinear and mixed analog/digital).

How to Use Invention

When DSM is used as an A/D converter, then any of described circuits, for direct processing of DSM pulse stream, can be used when needed. In particular, in low frequency applications such as environmental monitoring, seismic, biomedical applications, control, instrumentation, etc., low-pass DSM is a well established A/D conversion procedure. Furthermore, DSM is low power consuming and dedicated circuits operate directly on a serial pulse stream. Only one wire is needed for internal and external connections and the use of one bit communication lines increases reliability and reduces cost of the system. This is a significant advantage compared to existing 8 or 16 bit DSP hardware. Hardware and operation of circuitry are very simple and special manuals or software is not needed to operate circuits. Only data sheets with operating conditions and pin-outs are needed. Eventual debugging is much simpler and faster compared to n-bit DSP hardware. VLSI is not a problem because of digital circuits' simplicity and the wide tolerance of DSM to component imperfections (±5%). In addition, because of the one bit (non-weighted) nature of the DSM stream, DSM DSP is not sensitive to catastrophic malfunctions as ordinary DSP. For example, if an error happens at the most significant or sign bit in an ordinary n-bit DSP system, then the system is out of order. This is not the case with a one bit processor because demodulation (DAC) is performed by a moving average filter. The main attributes of a DSM DSP system are high resolution of DSM ADC (24-bit), high signal-to-noise ratio and dynamic range (over 100 dB), low power consumption and the possibility of direct arithmetic operation on a DSM pulse stream. Thus, it will be appreciated by those skilled in the art that the present invention is not restricted to the particular preferred embodiments described with reference to the drawings, and that variations may be made therein without departing from the scope of the present invention as defined in the appended claims and equivalents thereof. The same circuitry can be employed for the direct processing of band-pass DSM (BP-DSM).

What is claimed is:

1. A digital circuit for squaring or rectifying operation of delta-sigma modulated (DSM) signal $X_n$, comprising:
    a delta-sigma modulator for producing a pulse density signal $X_n$;
    a delay element D for delaying the signal $X_n$ one clock pulse;
    an XOR logic gate for accepting both the signal $X_n$ of the DSM and the signal $X_{n-1}$ of the delayed element D; and
    a low-pass filter (LPF) for averaging (demodulation) and producing a signal p(t), which is the square of an input signal x(t).

2. A digital circuit for alternate current to direct current (AC-to-DC) converter, comprising:
    a delta-sigma modulator (DSM) for producing a pulse density signal $X_n$;
    a first delay element D for delaying the signal $X_n$ one clock pulse;
    a first XOR logic gate for accepting both the signal $X_n$ of DSM and the signal $X_{n-1}$ of the first delay element D;
    a 90° phase shift circuit to shift the signal $X_n$ and produce a signal $Y_n$;
    a second delay element D for delaying signal $Y_n$ one clock pulse;
    a second XOR gate for accepting both the signal $Y_n$ of the 90° phase shift circuit and the signal $Y_{n-1}$ of the second delay element D;
    a delta adder to add outputs of the XOR gates; and
    a low-pass filter (LPF) to produce a DC signal.

3. A mix mode analog/digital multiplier of two delta sigma modulated (DSM) sequences, comprising:
    an analog adder for adding x(t) and y(t);
    an analog sub-tractor for subtracting x(t) and y(t);
    two synchronous delta-sigma modulators (DSM) for producing a pulse density signals $(X_n+Y_n)$ and $(X_n-Y_n)$;
    a first delay element D for delaying the signal $(X_n+Y_n)$ one clock pulse;
    a second delay element D for delaying the signal the $(X_n-Y_n)$ one clock pulse;
    a first XOR logic gate for accepting both the signal $(X_n+Y_n)$ of the first DSM and the delayed signal $(X_{n-1}+Y_{n-1})$ of the first delay element D;
    a second XOR logic gate for accepting both the signal $(X_n-Y_n)$ of the second DSM and the delayed signal $(X_{n-1}-Y_{n-1})$ of the second delayed element D; and
    a low-pass filter (LPF) to produce demodulated signal p(t).

4. A digital multiplier of two synchronous delta-sigma modulated (DSM) pulse signals, comprising:
    two synchronous DSM to produce binary signals $X_n$ and $Y_n$;
    two delta adders to form sum (signal A) and differences (signal B) of DSM signals $X_n$ and $Y_n$;
    two squaring circuits to produce signals C and D;
    a third delta adder to produce signal E=C−D; and
    a low-pass filter (LPF) to produce product p(t)=x(t)y(t).

5. A circuit for root-mean-square to direct current (RMS-to-DC) conversion, comprising:
    a delta-sigma modulator (DSM) for producing a pulse density signal $X_n$;
    a delay element for delaying the signal $X_n$ one clock pulse;
    a first XOR logic gate for accepting both the signal $X_n$ and the signal $X_{n-1}$ of the delay element;

a 90° phase shift circuit to produce a signal $X_{90}$;
a second XOR logic gate for accepting both the signal $X_{90}$ and a delayed signal of the signal $X_{90}$;
a delta adder to add squared signals B and C;
a switching multiplier M to produce reference signal m(t); and
a low-pass filter (LPF) for producing a DC signal.

6. A delta-sigma based correlator circuit, comprising:
two synchronous delta-sigma modulators (DSM) for producing a pulse density signals $X_n$ and $Y_n$;
a delay line for signal the $X_n$, comprising plurality of delay elements D;
a first delta adder to produce the sum of the signals, $E=X_n+Y_n$;
a second delta adder to produce the difference of the signals, $G=X_n-Y_n$;
two squaring circuits to produce two squared signals F and H;
a third delta adder to produce the sum C=H+F; and
a low-pass filter (LPF) to produce correlated signal c(t).

7. A mixed mode analog/digital squaring circuit, comprising:
a delta-sigma modulator (DSM) to receive an analog signal x(t), and produce pulse density stream $X_n$;
a first switching multiplier to multiply non-inverted input x(t) by $X_n$;
a second switching multiplier to multiply inverted input x(t) by $X_n$; and
a low-pass filter (LPF) to filter combined outputs of the switching multipliers, and produce an output signal $p(t)=x^2(t)$.

8. A circuit for multiplication by a constant greater or less than one, comprising:
a delta-sigma modulator for producing pulse density stream $X_i$;
a moving averaging filter of the stream $X_i$;
a three-input summing circuit to produce a signal $W_n$;
a delay element $Z^{-1}$;
a multiplier for multiplying a constant L with the sign of a delayed signal $W_{n-1}$;
a sign detector; and
an moving averager to produce a result of computation.

9. A circuit for addition of three or multiple delta-sigma modulated input signals, comprising:
three synchronous delta-sigma modulators for producing pulse density signals $X_n$, $Y_n$, and $Z_n$;
a three-input summing circuit for producing a signal $W_n$;
a delay element $Z^{-1}$;
a multiplier;
a sign detector;
an moving averager for producing a result of computation;
three delta adders (DA); and
two D flip-flops.

* * * * *